J. M. JOHNSON.
INDICATOR.
APPLICATION FILED OCT. 7, 1915. RENEWED JAN. 22, 1918.
1,268,125.
Patented June 4, 1918.
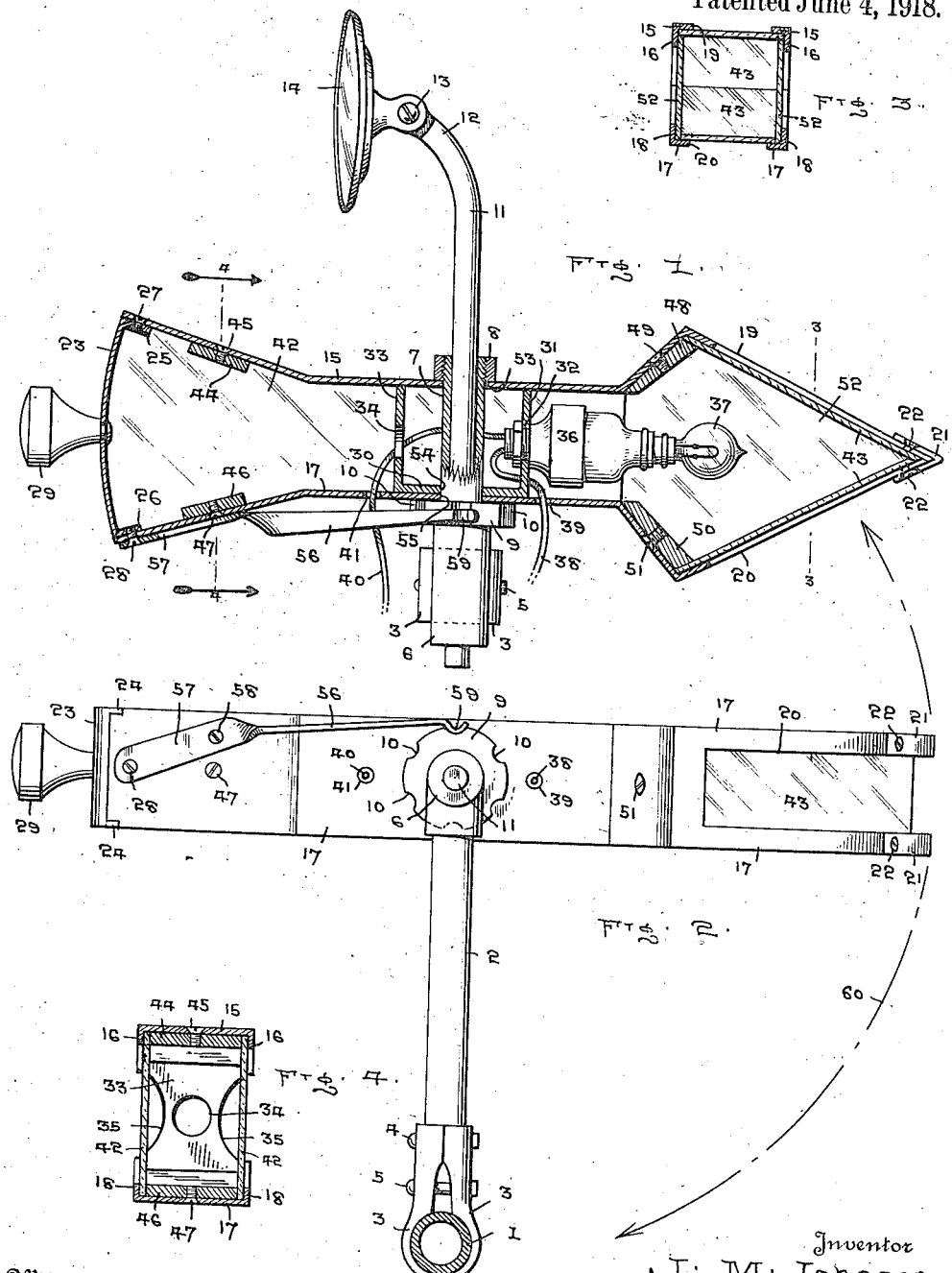

UNITED STATES PATENT OFFICE.

JOSEPH M. JOHNSON, OF READING, PENNSYLVANIA, ASSIGNOR OF ONE-HALF TO SAMUEL S. JOHNSON, OF HARRISBURG, PENNSYLVANIA.

INDICATOR.

1,268,125.  Specification of Letters Patent.  Patented June 4, 1918.

Application filed October 7, 1915, Serial No. 54,637. Renewed January 22, 1918. Serial No. 213,270.

*To all whom it may concern:*

Be it known that I, JOSEPH M. JOHNSON, a citizen of the United States, residing at Reading, in the county of Berks and State of Pennsylvania, have invented certain new and useful Improvements in Indicators; and I do hereby declare the following to be a full, clear, and exact description of the invention, such as will enable others skilled in the art to which it appertains to make and use the same.

This invention relates to indicators and more particularly to indicators for vehicles, preferably automobiles, and one of the objects of this invention is the provision of an indicator which can be readily attached to the wind shield of an automobile, the dash board of a vehicle, or other suitable point upon the vehicles for indicating the direction of the vehicle especially when turning around street corners, forks of a road, and the like.

Another object of this invention is the provision of an indicator which will efficiently indicate the direction of the vehicle during the day as well as during the night.

Another object of this invention is the provision of an indicator which is not only clearly visible during the day, but is provided with different shades of glass and means for illuminating the indicator for indicating the direction of the vehicle at night.

Another object of this invention is the provision of an indicator combined with a reflector mirror in such a manner that the indicator may be readily operated by the operator of the vehicle or machine and in accordance with the location and position of the object or objects disclosed by the reflector mirror.

Another object of this invention is the provision of an indicator combined with a reflector mirror which is simple in construction, efficient in use, and which can be manufactured and sold upon the market at a nominal cost.

Other objects and advantages will be hereinafter more clearly set forth in the specification, defined in the claims, and illustrated in the accompanying drawings, in which:

Figure 1 is a vertical longitudinal sectional view of the device showing the manner of mounting the same and the interior construction thereof.

Fig. 2 is a bottom plan view of the device and its support.

Fig. 3 is a vertical transverse sectional view on line 3—3 of Fig. 1.

Fig. 4 is a vertical transverse sectional view on line 4—4 of Fig. 1 looking in the direction of the arrows.

While the invention, for the sake of clearness and convenience, will be hereinafter described as applied to the wind shield of an automobile, it is to be understood that the invention is equally applicable for attachment upon vehicles, bicycles, boats, and the like.

Referring to the drawings, wherein like reference characters denote corresponding parts throughout the several views, 1 denotes a cross sectional view of a portion of the frame of a wind shield, and 2 the supporting arm secured upon the wind shield frame 1 through the medium of the pair of gripping fingers 3 secured upon one end of the supporting arm 2 through the medium of the bolt 4, and provided with the binding bolt 5. Secured upon the outer end of the supporting arm 2 is the enlarged portion of the sleeve 6, the sleeve 6 being formed with the upwardly projecting reduced portion 7 having threaded upon its upper end the nut 8. Secured upon the reduced portion 7, and adjacent the enlarged portion 6 of the sleeve, is the disk or wheel 9 having formed in its periphery the notches 10, preferably six in number. Pivotally projecting through the enlarged portion 6 and the reduced portion 7 of the sleeve is the stem 11 provided with the curved upper end 12, upon which is pivotally mounted, as at 13, the reflector mirror 14.

The indicator consists of a casing or housing formed preferably in the shape of an arrow, and comprises the upper plate 15 provided at its sides with the right angular flanges 16, and the lower plate 17 provided at its sides with the right angular flanges 18. The central portions of the plates 15 and 17 are parallel to each other to form the body of the arrow, but their rear end portions are bent to diverge or branch outwardly from each other to provide the tail of the arrow, while the forward ends of the plates 15 and 17 are first bent to diverge or extend outwardly from each other for a distance, and then bent so as to converge or extend inwardly toward each other until their extreme forward ends meet to form the apex or point of the arrow head thus formed. The converging portions of the plates 15 and 17 forming the point of the arrow head are cut away from their forward ends for a considerable width and extend for a considerable distance inwardly to form the slot or opening 19 in the plate 15, and the slot or opening 20 in the plate 17. The forward ends of the plates 15 and 17 at each side of the slots or openings 19 and 20 are secured together by the clips 21 and the screws 22. The ends of the diverging portions of the plates 15 and 17, forming the tail of the arrow, are inclosed and connected together by the rear plate 23, provided with the side flanges 24, the top flange 25 and the bottom flange 26, the end of the plate 15 being secured to the top flange 25 of the rear plate 23 by the screw 27, while the rear end of the plate 17 is secured to the bottom flange 26 of the plate 23 by the screw 28. Centrally secured to the rear plate 23 of the indicator is the operating knob or handle 29.

Positioned centrally within the indicator is a supporting frame, consisting of the base plate 30, provided at its forward end with the upstanding plate 31 having the central aperture 32 formed therein, and the rear upstanding plate 33 having the central aperture 34 formed therein. The base plate 30 of the supporting frame rests upon the inner surface of the lower plate 17 of the indicator, and its upstanding end plates 31 and 33 extend upwardly to the inner surface of the upper plate 15 of the indicator. The base plate 30 of the supporting frame and its upstanding plates 31 and 33 are of a width slightly less than the distance between the flanges 16 of the upper plate 15 of the indicator and the distance betwen the flanges 18 of the lower plate 17 of the indicator, the side edges of the upstanding plates 31 and 33 of the supporting frame are cut away to provide the enlarged recesses 35, as clearly shown in Fig. 4 of the drawings.

Suitably secured in the aperture 32 of the upstanding plate 31 of the supporting frame is the electric light socket 36, provided with the bulb 37, and connected to the socket 36 is the incoming wire 38, which passes through one of the recesses 35 of the plate 31 and through the aperture 39 formed in the lower plate 17 of the indicator, and also connected to the socket 36 is the return wire 40, which passes from the socket 36 through one of the recesses 35 of the plate 33 and thence through the aperture 41 also formed in the lower plate 17 of the indicator. The electric light socket 36 projects forwardly from the upstanding plate 31 of the supporting frame, so that its bulb 37 will be positioned well into that portion of the indicator which constitutes the arrow head.

The connecting wires 38 and 40 of the lamp may be connected to any suitable source of electricity.

Positioned between the portions of the plates 15 and 17, which constitute the body and the tail of the arrow, and resting against the respective flanges 16 and 18 of the plates 15 and 17, are the translucent members 42, and also positioned in that portion of the plates 15 and 17 which constitutes the arrow head, and for covering the respective openings 19 and 20, are the translucent members 43. The translucent members 42 have their rear end portions retained against the flanges 16 and 18 of the plates 15 and 17, through the medium of the upper transversely disposed block 44, secured upon the inner surface of the plate 15 by the screw 45, and the lower transversely disposed block 46 secured upon the inner side of the plate 17 by the screw 47. The forward end portions of the translucent members 42 are retained against the flanges 16 and 18 of the plates 15 and 17 by the side edges of the base plate 30 of the supporting frame within the indicator, and the portions of the side edges of the upstanding plates 31 and 33 at each side of the recesses 35. The translucent members 43 are retained in the forward ends of the plates 15 and 17 of the indicator for covering the respective openings 19 and 20, by the meeting of the forward ends of the translucent members 43 at the apex or point of the portion constituting the arrow head, the rear end of the upper member 43 retained in position by the upper transversely disposed block 48 secured against the under side of the plate 15 by the screw 49, and the rear edge of the lower member 43 being retained in position through the medium of the lower transversely disposed block 50, secured against the inner surface of the plate 17 by the screw 51.

Positioned between that portion of the plates 15 and 17 which constitutes the arrow head, and bearing against the flanges 16 and 18 of the plates 15 and 17, are the translucent members 52, retained in position against the flanges 16 and 18 of the plates 15 and 17 by the side edges of the translucent members 43 and the transversely disposed blocks 48 and 50.

For rotatably mounting the indicator upon the reduced portion 7 of the sleeve the upper plate 15 of the indicator is provided with the centrally disposed aperture 53, the base plate 30 of the interior supporting frame is provided with the centrally disposed aperture 54, and the lower plate 17 of the indicator is provided with the centrally disposed aperture 55. The apertures 53, 54, and 55 register with each other, and through these apertures projects the reduced portion 7 of the sleeve, the indicator being retained upon the reduced portion 7 of the sleeve by the nut 8, the under surface of the lower plate 17 of the indicator bearing upon the disk or notched wheel 9, and for retaining the indicator in its adjusted rotatable positions the spring 56 is provided. The spring 56 is wrung or twisted remote from one of its ends to provide the base member 57, disposed at right angles to the spring 56, and secured upon the under side of the plate 17 by the screw 28 and the additional securing screw 58. The free end of the spring 56 being provided with the concavo-convex lip or lug 59, adapted to spring into certain of the notches 10 of the disk or wheel 9 for retaining the indicator in its respective adjusted positions.

The metallic parts of the indicator are preferably formed of any suitable highly polished or bright metal so as to be readily discernible in the day time. The translucent members 42 and 43 may be formed of any suitable translucent material and color, but I preferably form these members 42 and 43 of green glass. The translucent members 52 may be also formed of any suitable translucent material and color, but I preferably form these members 52 of red glass.

The application and operation of the device is briefly described as follows:—

The device is attached to the wind shield, when used upon automobiles, at the side nearest the operator of the vehicle so as to be within easy reach, and by forming the indicator in the shape of an arrow the direction of the vehicle may be readily determined in the day time by the pointing of the arrow, for instance, if the vehicle is driving straight ahead, the indicator assumes the position at right angles to the supporting arm 2, as shown in Figs. 1 and 2, and therefore points straight ahead. Should it be desired to turn either to the right or left, the operator will grasp the knob 29 and swing the indicator in a manner so that the head of the arrow will either point to the right or left, describing an arc as shown by the arrow line 60. This swinging movement of the indicator will cause the end 59 of the spring 56 to be automatically released from one of the notches 10 of the disk or wheel 9, the wheel 9 being nonrotatable, whereby the indicator may be swung to the desired position, or until the end 59 of the spring 56 engages another of the notches 10 in the wheel 9, thereby retaining the indicator in the desired adjusted position, after which, when the turn has been completed, the operator returns the indicator to its normal straight position.

When using the indicator at night, a suitable switch in the lamp circuit is closed and the bulb 37 thereby lighted, and when the vehicle is going straight ahead and the indicator in normal position, the light from the bulb 37 will pass through the green translucent members 43 thereby indicating that the vehicle is traveling in a straight course. However, should it be desired to turn to the right or left, the operator manipulates the indicator in the manner before described, whereby the light from the bulb 37 will pass through the red translucent members 52 in the head of the arrow, and the light from the bulb 37 will also pass through the recesses 35 of the upstanding members 31 and 33 of the interior supporting frame, and thereby shine through the green translucent members 42 in the sides of the body portion and the tail of the arrow, whereby an approaching vehicle from either in front or the rear will be warned of the direction in which the vehicle is to turn, the red translucent members 52 clearly outlined the head of the arrow, and the green translucent members 42 clearly outlining the body portion and tail of the arrow. After the turning movement has been completed the indicator is returned to its straight normal position as above described, whereby the rays from the bulb 37 will shine through the green translucent members 43 in the pointed end of the arrow for indication to the approaching vehicles from the front that the vehicle is assuming a straight course, and at the same time the rays from the bulb 37 shining through the red translucent members 52 and the green translucent members 42, will warn vehicles approaching at right angles when traveling along intersecting streets or thoroughfares, the direction that the vehicle carrying the indicator is traveling.

Another advantageous feature of this invention is the mounting of the indicator and the reflector mirror upon the same support and in close proximity to each other, thus enabling the operator of the automobile or other vehicle to readily detect the approach of vehicles from the rear, and at the same time to readily view the position or positioning of the indicator, and thus be able to concentrate his sight upon one point and not be required to have to look in the reflector mirror at one point and then in another direction to view the indicator.

While I have herein shown and described the preferred embodiment of the invention, minor variations and alterations may be made therein from time to time without departing from the spirit of the invention or the scope of the claim.

Having described my invention, what I claim as new and desire to secure by Letters-Patent, is:—

An indicator device of the class described, comprising a support, a supporting sleeve carried by one end of said support, a translucent indicator arm rotatably mounted on said sleeve, a U shaped bracket arranged within the indicator arm and rotatably mounted on said sleeve, the arms of said bracket being each apertured and disposed transversely of the indicator arm, the vertical side edge being cut away to provide light emitting openings, illuminating means attached to and in the aperture of one of said bracket arms and projecting within one end of the indicator arm, the light thereof radiating through between said bracket arms and the sides of the indicator arms to the opposite end of the indicator arm, and means carried by the supporting sleeve adapted to coöperate with the indicator arm to hold the said indicator arm in adjusted position.

In testimony whereof I have signed my name to this specification in the presence of two subscribing witnesses.

JOSEPH M. JOHNSON.

Witnesses:
JOHN K. HAHN,
B. W. HOMAN.